United States Patent [19]

Sakakibara et al.

[11] Patent Number: 4,878,887
[45] Date of Patent: Nov. 7, 1989

[54] ENDLESS TRANSMISSION BELT

[75] Inventors: Shiro Sakakibara; Yoshinori Miyaishi, both of Aichi; Yoshiaki Kano, Gifu, all of Japan

[73] Assignee: Aisin-Aw Kabushiki Kaisha, Japan

[21] Appl. No.: 287,322

[22] Filed: Dec. 21, 1988

[30] Foreign Application Priority Data

May 17, 1988 [JP] Japan .................................. 63-118188

[51] Int. Cl.$^4$ ............................................... F16G 1/22
[52] U.S. Cl. ...................................................... 474/245
[58] Field of Search ............... 474/237, 240, 242, 244, 474/245, 201, 214–217

[56] References Cited

U.S. PATENT DOCUMENTS

| | | | |
|---|---|---|---|
| 4,512,754 | 4/1985 | Cole et al. | 474/245 |
| 4,580,999 | 4/1986 | Ledford | 474/245 X |
| 4,655,735 | 4/1987 | Sakakibara et al. | 474/245 |
| 4,737,137 | 4/1988 | Miyaishi | 474/245 |
| 4,753,627 | 6/1988 | Kawamoto | 474/18 |

*Primary Examiner*—Thuy M. Bui
*Attorney, Agent, or Firm*—Lorusso & Loud

[57] ABSTRACT

An endless transmission belt of the invention includes a plurality of sets of link plates and a plurality of pin pairs, each pair of pins linking one end of one set of link plates to an adjacent end of another set of link plates. A plurality of blocks are mounted on the link plates and extend around the circumference of the belt. Each of the blocks has a pin engagement groove defined by a circumferential contact surface for engaging a pin in the running direction of the belt, an opening and a pair of side walls each extending from the circumferential contact surface to the opening. One of side walls provides a radial contact surface for a pin. Each of the pins has a transverse cross-section defined in part by (1) a rocking surface for contact with its paired pin, (2) a first curved surface for radial contact with a sidewall of the pin engagement groove and (3) a second curved surface for contacting the circumferential surface of a block and the link plates. The dimensions of the radial contact surface of the pin engagement groove and the dimensions of the surfaces of each pin are selected to minimize, where the belt passes over a pulley, the difference between (1) $\Delta r$ which is the total of the displacement of the points of contact between paired pins as a result of the pins of a pair rolling with respect to each other, the displacement of the pins per se and the relative displacement between the pairs of pins and the blocks due to their rotation relative to one another and (2) $\Delta r_i$ which is the ideal $\Delta r$, from the viewpoint of variation in belt speed, vibration and noise.

10 Claims, 22 Drawing Sheets $Vx = rw$ $Vx' = rw \cos \theta$

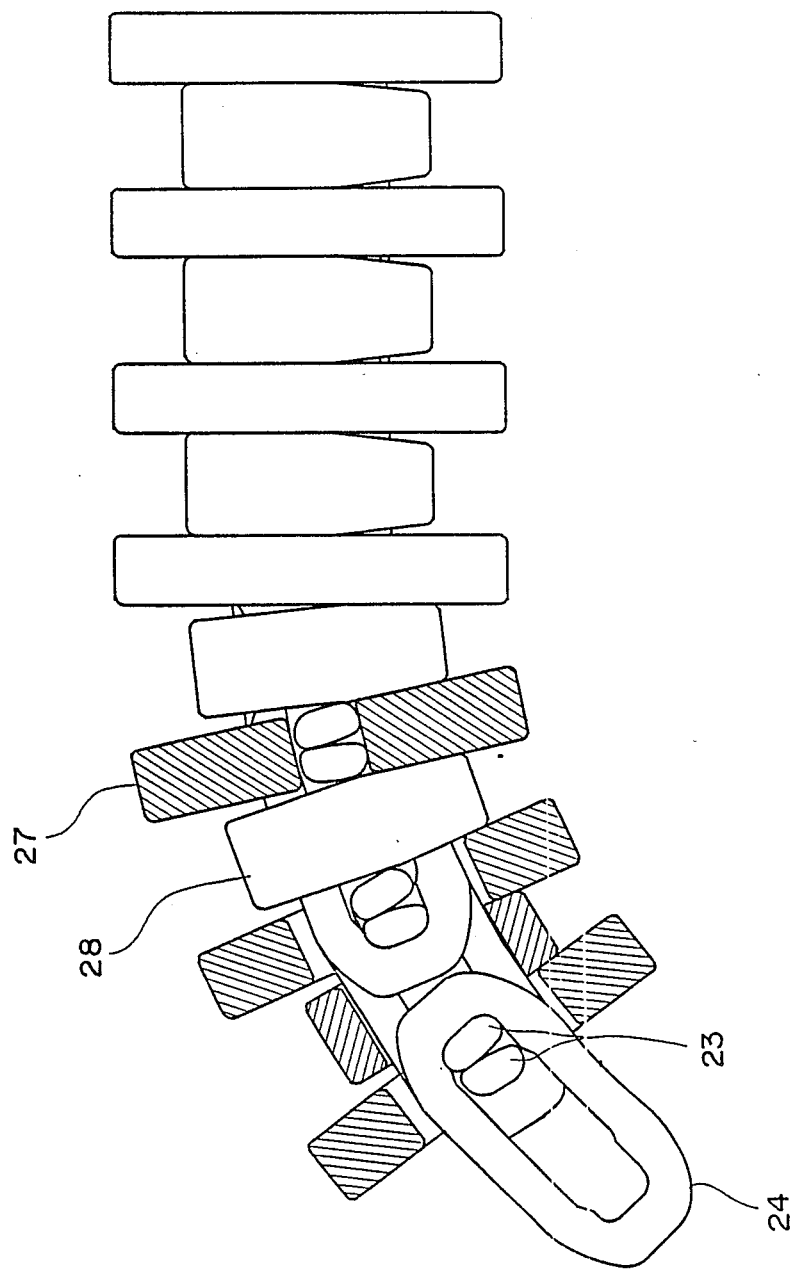

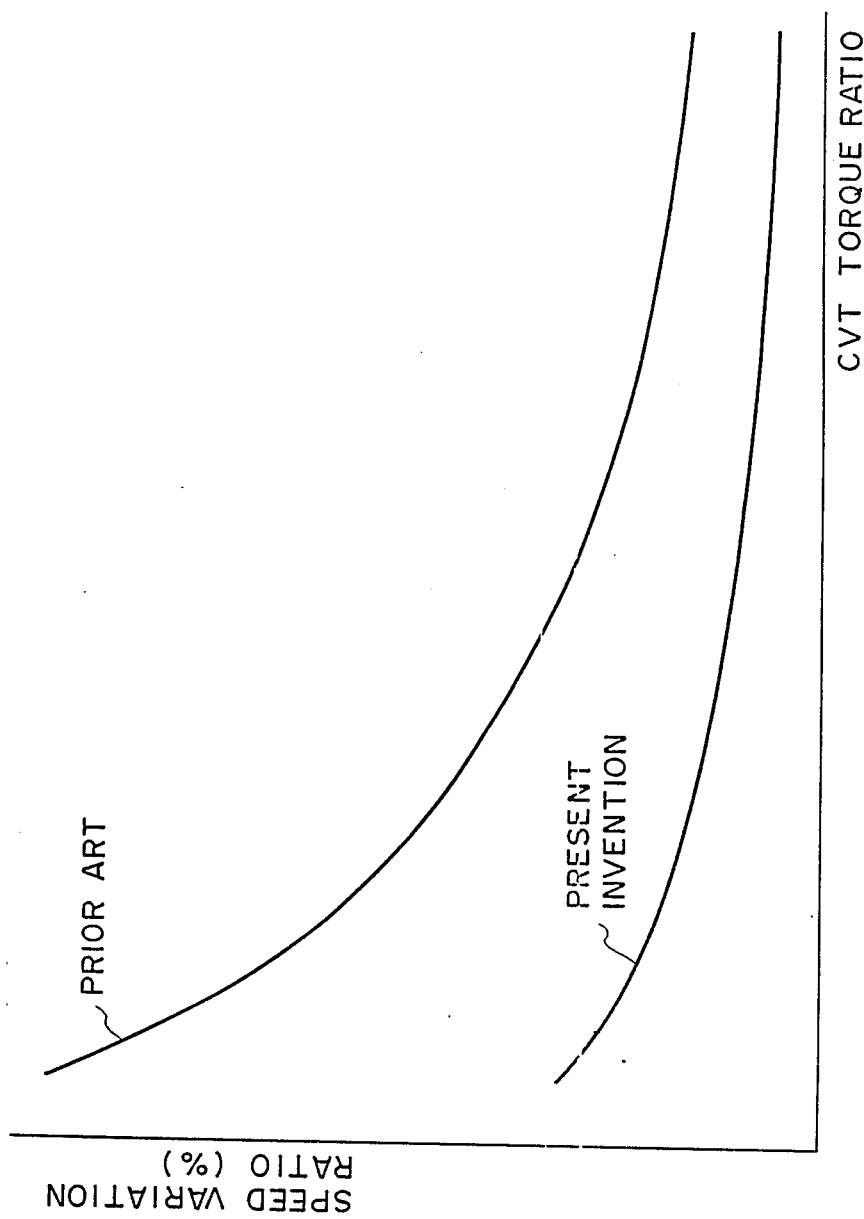

ENDLESS TRANSMISSION BELT

BACKGROUND OF THE INVENTION

The present invention relates to endless transmission belts and, in particular, to endless transmission belts for use in continuously variable transmissions of the chain type in which a number of link plates are interconnected in an endless manner.

A conventional endless belt for use in continuously variable transmissions of the above-mentioned type is shown in FIGS. 1 through 4.

The conventional endless transmission belt 1, shown in FIGS. 1 through 4 includes a plurality of link plates 2 which are interconnected by a plurality of pins, thereby forming sets 5 of the link plates 2, and first and second blocks 6 and 7 which are mounted on the sets 5. Each of the link plates 2 has pin holes 2a and 2b formed therein at its two ends. Pairs 3 of pins are passed through the pin holes 2a and 2b, thereby alternately interconnecting the link plates 2.

As shown in FIG. 4, each pair of pins 3 comprises paired pins 3a and 3b having contact surfaces P1 on which the pins 3a and 3b come into mutual rolling contact. The pins 3a and 3b are passed through the pin holes 2a and 2b, with their contact surfaces P1 facing each other. As shown in FIGS. 2 and 3, each pair 3 of pins has a length greater than the width of the sets 5 of the link plates 2 by a predetermined dimension.

Each of the first and second blocks 6 and 7 has an opening portion 6b and 7b respectively through which the sets 5 of link plates 2 are passed, and tapered surfaces 6c or 7c formed on the left and right sides of the block as viewed in FIG. 1 and adapted to come into contact with the pulleys. Pin engagement grooves 6a or 7a for receiving the pairs 3 of pins are formed in the contacting surfaces of the first and second blocks 6 and 7.

Further, retainer engagement grooves 6e and 7e are formed on the left and right sides of each of the first and second blocks 6 and 7 respectively. Retainers 9 are received in the facing pairs retainer engagement grooves 6e and 7e to retain the pairs 3 of pins in place.

The above-described endless transmission belt is advantageous in that the pins are positively engaged with the link plates, and V-blocks are positively engaged with the pins while they can smoothly rotate relative to the pins, thereby enabling great improvements in durability and torque transmission capacity to be achieved.

An endless transmission belt of the type described above, however, has the following disadvantages. As shown in FIGS. 5 (a) and (b), when the belt is fitted around the pulleys, since a large number of segments, each corresponding to the length of the chain pitch, are positioned in the circular arc determined by the rotational radius of the belt, the belt experiences speed variations, vibration, and generation of noise (polygon effect). In FIGS. 5 (a) and (b), symbols Vx, r, $\omega$, V'x, and $\theta$ represent the speed of the belt in the circumferential direction, the radius of the bent portion of the belt, the angular velocity, the horizontal component of the circumferential speed, and the angle of rotation, respectively.

In addition, when the pins 3a and 3b come into a portion of the belt curved around a pulley, the point of their mutual rolling contact may be displaced, the pins 3a and 3b per se is displaced in the radial direction, and the relative position of the pins 3a and 3b and the blocks 6 and 7 may be changed due to the rotation of these members relative to one another, thereby resulting in an increased degree of variation in the belt speed, vibration, and noise.

SUMMARY OF THE INVENTION

An object of the present invention is to overcome the above-stated problems, and to provide an endless transmission belt which minimizes, as much as possible, variations in the speed of the belt, the occurrence of vibration, and the generation of noise when the belt becomes engaged with the pulleys, and is also capable of preventing pins in the pulley-engaged portion of the belt from causing any variations in the speed of the belt, any vibration, and noise due to displacement of the points of mutual rolling contact between the pins, radial displacement of the pins per se, and changes in the relative position of the pins and the blocks resulting from relative rotation of these members.

In order to achieve the above-stated object, an endless transmission belt according to the present invention comprises: a plurality of blocks arranged around the circumference of the belt; a plurality of pairs of pins arranged around the circumference of the belt and engaging the blocks; and a plurality of sets of link plates, each of the sets of link plates being linked at each end to an adjacent set through a pair of pins.

Each of the blocks has a pin engagement groove providing a circumferential contact surface for contact with a pin in the running direction of the belt, and a radial contact surface for contact with a pin in the radial direction of the pulley-engaged belt portion.

Each of the pins has a cross-sectional configuration defined by (1) a continuous rocking surface on which the pin comes into mutual contact with the other pin of the pair, (2) a first curved surface on which the pin comes into contact with the block in the radial direction, (3) a second curved surface on which the pin comes into contact with the sets of link plates and with the block in the circumferential (running) direction, and a surface for contacting the link plates in a manner preventing idle rotation of the pin.

The configuration of the radial contact surface of the pin engagement groove of each block and the configuration of the of each pin are such that, where the belt engages a pulley, the difference is minimized as between the total of (1) the displacement of the points of contact between the pairs of the pins due to their mutual rolling contact, (2) the displacement of the pins per se due to their mutual rolling contact, and the (3) relative displacement of the pins and the blocks due to their rotation relative to one another, on one hand, and the ideal amount by which the locus of the points of mutual contact between the pairs of the pins is displaced relative to the locus of the radius of rotation of the belt with neither variation in the speed of the belt nor vibration, on the other.

The rocking surface of each pin may be formed as a curved surface having a single radius of curvature, with the centers of the first and second curved surfaces of the pin being positioned on the radial center line (major axis in transverse cross-section) through the pin.

Alternatively, the rocking surface of each pin may comprise a first rocking surface portion located at a position close to the circumferential center line (minor axis in transverse cross-section) through the pin, and a second rocking surface portion adjacent to the first rocking surface portion, located at a position remote from the circumferential center line through the pin, and having a larger radius of curvature than the first rocking surface portion, with the centers of the first and second curved surfaces of the pin being positioned on the radial center line through the pin.

Alternatively, the rocking surface may be formed as a curved surface having a single radius of curvature, with the center of the first curved surface of the pin being centered off of the radial center line through the pin.

Further, the radial contact surface of the pin engagement groove formed in each block for engagement with and the pin may either be (1) perpendicular to the open side of the groove inclined to the open side in such a manner as to enlarge the opening of the groove or (3) formed as a circular arc surface, the center of which may be positioned on either the radially inward side or the radially outerward side of the pin engagement groove.

By virtue of the above-described construction, according to the present invention, when the belt becomes engaged with the pulleys, the points of mutual contact between the pins move on the ideal locus, thereby eliminating any vertical displacement of he points of contact, and preventing any variation in the speed of the belt, vibration, and noise.

BRIEF DESCRIPTION OF THE DRAWINGS

FIG. 26 is a partially sectioned side view of yet another embodiment endless transmission belt in accordance with the present invention;

FIG. 30 is a graph showing the relationship between the speed variation ratio and the CVT torque ratio.

DESCRIPTION OF THE PREFERRED EMBODIMENTS

Figure 1:
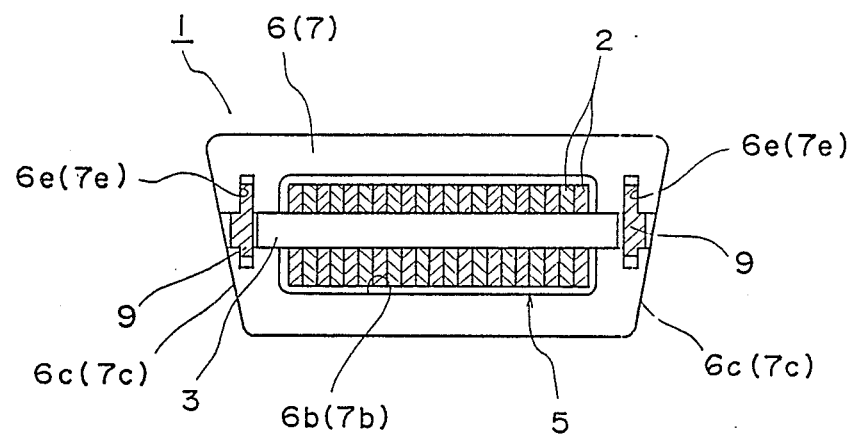
FIG. 1 is an elevational front view, in cross-section, of a conventional endless transmission belt.
Figure 2:
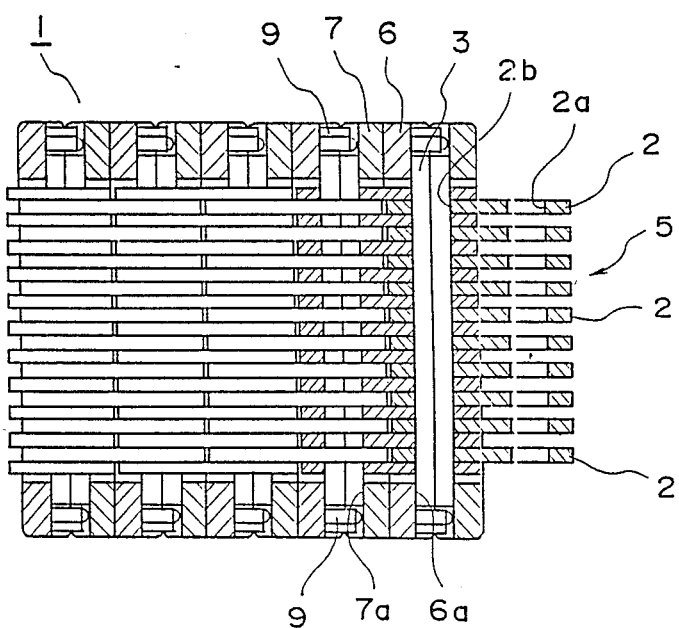
FIG. 2 is a plan view showing a longitudinal section of the conventional endless transmission belt.
Figure 3:
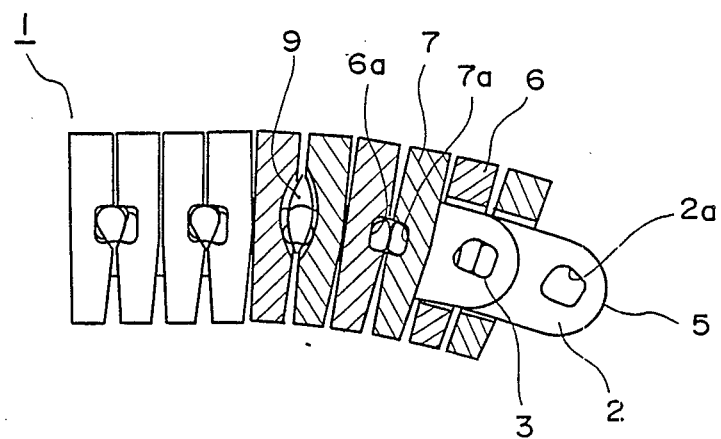
FIG. 3 is a partially sectioned side view of the conventional endless transmission belt.
Figure 4:
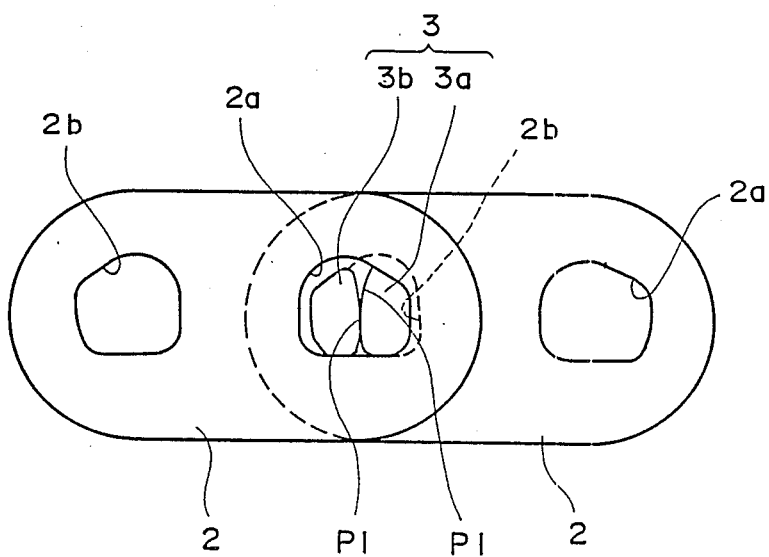
FIG. 4 is a side view of sets linked of link plates in a straight portion of the belt.
Figure 5:
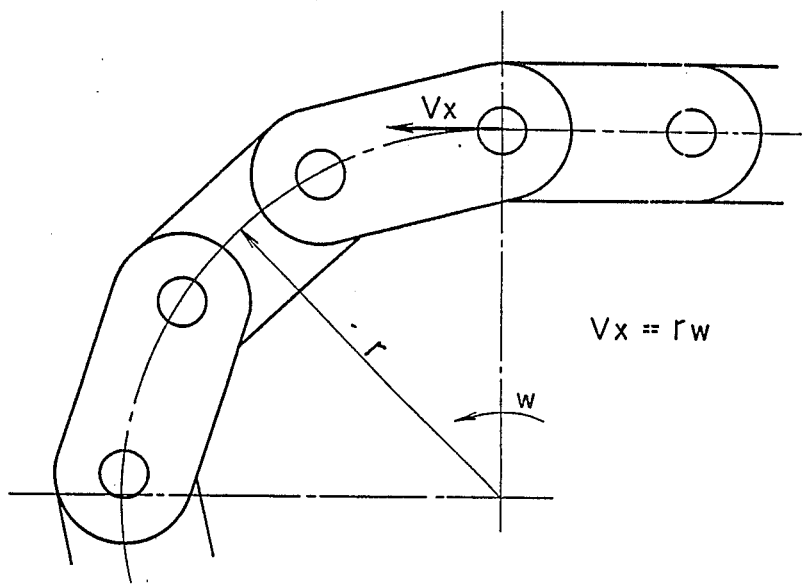
FIGS. 5 (a) and (b) are diagrams explaining the change in the horizontal component of belt velocity as an endless transmission belt passes over a pulley.
Figure 5:
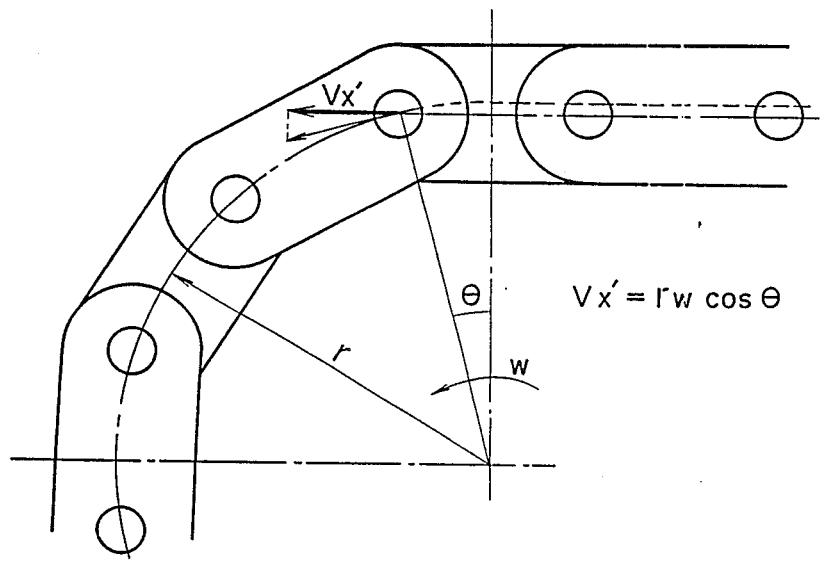

Embodiments of the present invention will now be described in detail with reference to the drawings.

Referring to FIGS. 6 through 9, reference numeral 11 denotes a pin. The transverse cross-sectional configuration of the pin 11 is symmetrical with respect to the center line 12 extending in the straight-running direction of the associated belt, with the two symmetrical parts of the cross-section located above and below the line 12.

The cross-sectional configuration of the pin 11 is defined by (1) a rocking continuous surface R1 on which the pin comes into contact with the other pin forming the same pair, (2) a first curved surface R2 on which the pin comes into radial contact with the associated block, (2) a second curved surface R3 which comes into contact with the associated sets of link plates and with the block in the running direction, and a flat surface L1 for contacting the link plates in a manner preventing idle rotation of the pin 11.

The first curved surface R2 meets the second curved surface R3 at the radial center line 13 which extends radially from the center of the pulley through the pin 11, and the second curved surface R3 meets the flat surface L1 at its other end. The rocking surface R1 and the first curved surface R2 are connected to each other by a curved surface R4 having a small radius of curvature.

The ratio between the radii of curvature $r_1$, $r_2$, and $r_3$ of the rocking surface R1, the first curved surface R2, and the second curved surface R3, respectively, is approximately equal to 6:2:1.

Figure 7:
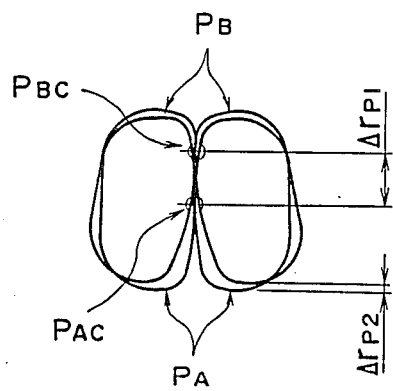
FIG. 7 is a view showing the position of pins when the belt becomes engaged with the pulley.

In FIG. 7, symbols $P_A$ and $P_B$ respectively denote the position of a pair of pins in (a) a straight portion of the belt running through the space between the pulleys, and in (B) the position of the pins when in that portion of the belt engaged with one of the pulleys, and symbols $P_{AC}$ and $P_{BC}$ respectively denote the point of contact between the pins in the former case (A), and the point of contact between the pins in the latter case (B). The amount of displacement of the point of contact between these pins resulting from their mutual rolling contact is denoted by the symbol $\Delta r_{p1}$, while the amount of displacement of the pins per se is denoted by the symbol $\Delta r_{p2}$.

Figure 8:
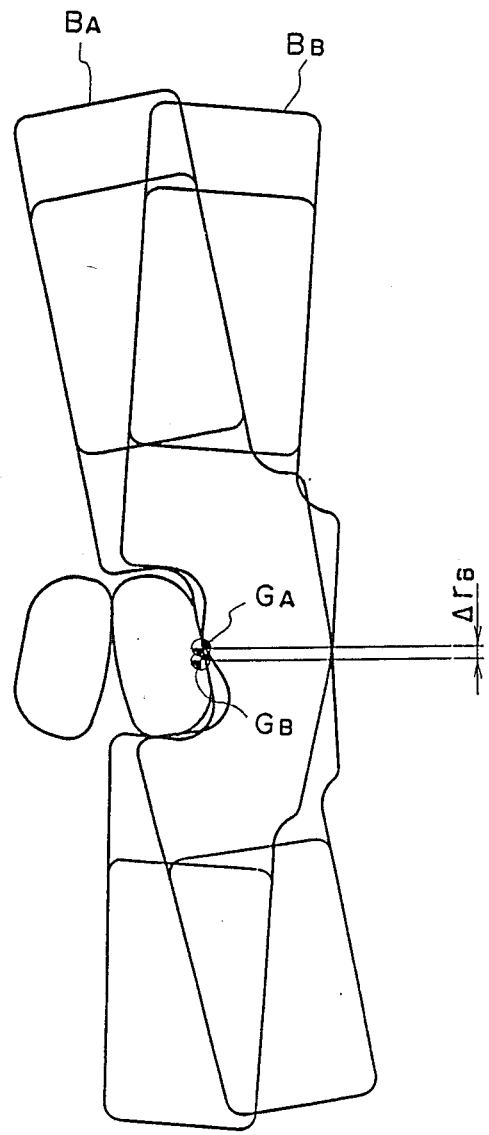
FIG. 8 is a view showing the position of a block when the belt becomes engaged with the pulley.

Further, in FIG. 8, symbols $B_A$ and $B_B$ respectively denote the position of a block (A) when it forms a straight run of the belt advancing through the space between the pulleys and, accordingly, the block does not rotate relative to the associated pin, and (B) the position of the block when it forms curved portion of the belt engaged with one of the pulleys where, the block rotates relative to the pin, and symbols $G_A$ and $G_B$ respectively denote the central points of the block in the former case (A) and in the latter case (B). The amount of relative displacement of the pin and the block resulting from their rotation relative to each other is denoted by the symbol $\Delta r_B$.

The total of the above-mentioned various amounts of displacement is calculated as follows:

$$\Delta r = \Delta r_{p1} + \Delta r_{p2} + \Delta r_B$$

The total of the amounts of displacement is calculated for various rotational angles.

Figure 9:
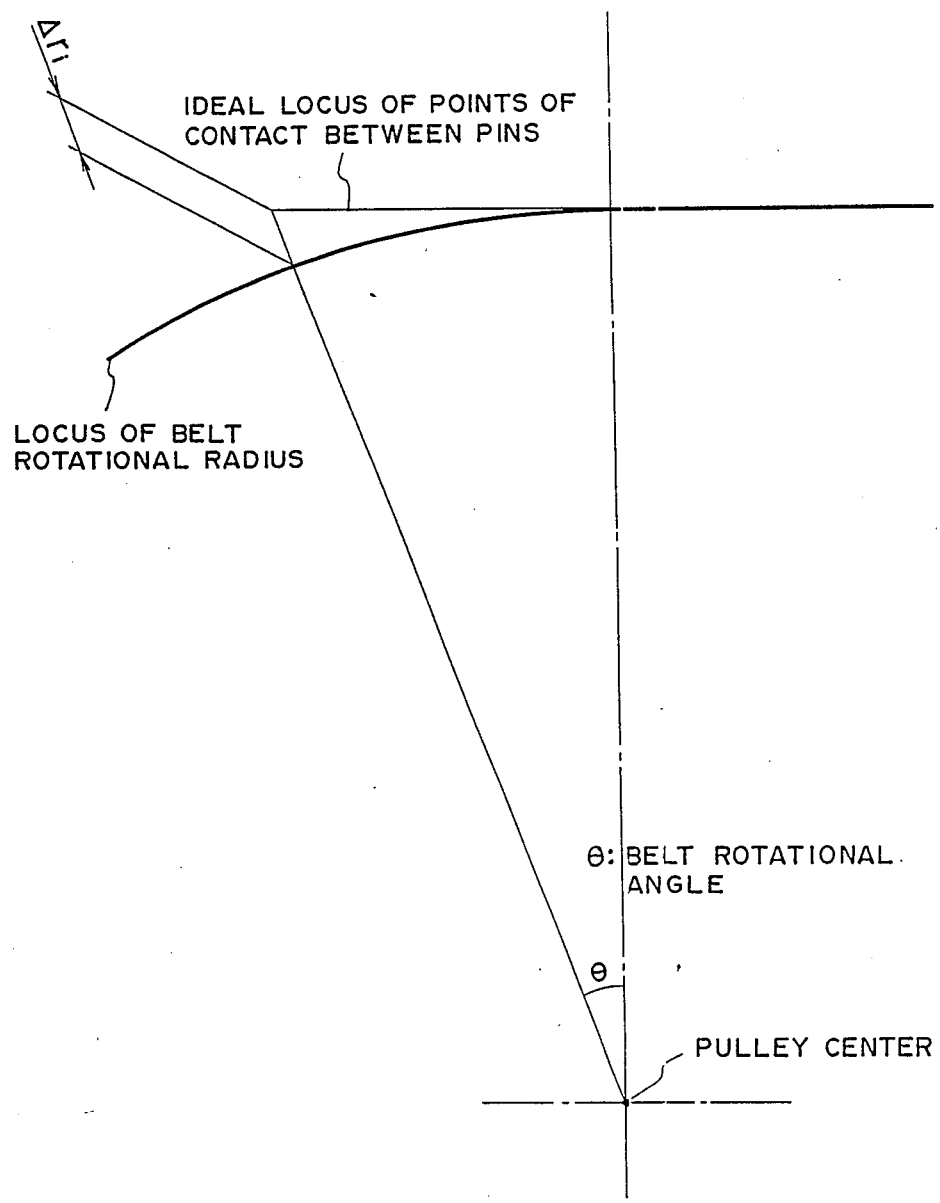
FIG. 9 is a view showing the ideal locus of the points of contact between pins when the belt becomes engaged with the pulley.

On the other hand, if the points of contact between the pins move on the ideal locus line shown in FIG. 9, the points of contact undergo neither vertical displacement, causing no variations in the speed of the belt, nor vibration, nor noise. Based on this, the ideal amount by which the locus of the points of contact between the pins maybe displaced relative to the locus of the rotational radius of the belt, with neither variation in the belt speed, nor vibration, nor noise, maybe calculated from FIG. 9. The calculated ideal amount is denoted by $\Delta r_i$.

Finally, the difference between the ideal displacement amount $\Delta r_i$ and the total $\Delta r$ of the aforementioned various amounts of displacement is calculated, and the dimensions of the aforementioned various surfaces are designed in such a manner such a that difference is minimized for any and all radius of curvature of the belt.

Figure 6:
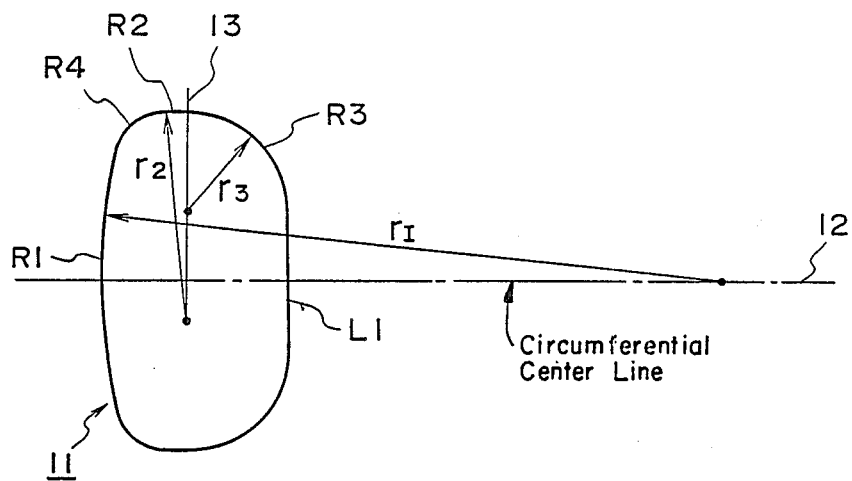
FIG. 6 is a transverse cross-sectional view of a pin of an endless transmission belt in accordance with the present invention.

As shown in FIG. 6, the center of the rocking surface R1 is positioned on the circumferential center line 12 which extends around the circumference of the belt through the center of each pin 11, while the centers of the first and second curved surfaces R2 and R3 are positioned on the radial center line 13 which extends radially from the center of the pulley through the pin 11.

Figure 16:
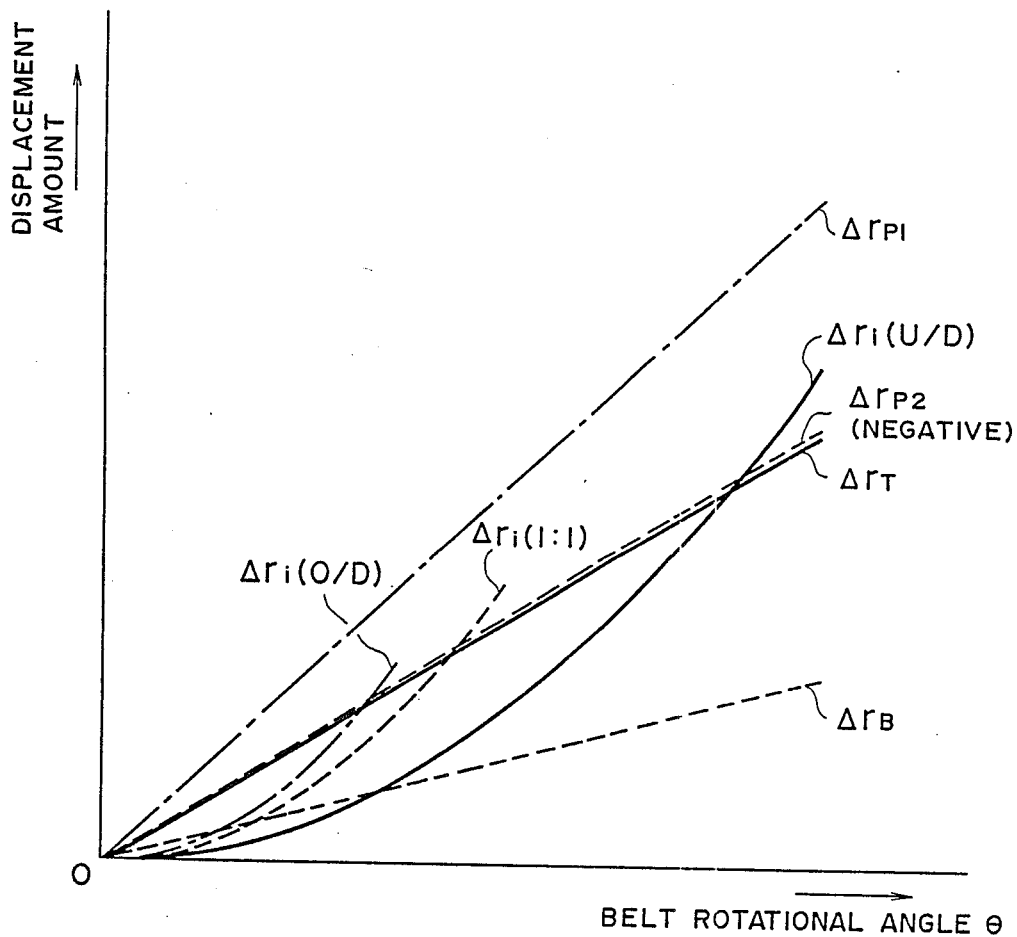
FIG. 16 is a graph showing the relationship between the angle $\theta$ of rotation of the belt and the displacement amount.

According to this embodiment, the relationships between the angle $\theta$ of rotation of the belt and the amounts of displacement are shown in FIG. 16.

Referring to the graph of FIG. 16, the ideal displacement amount $\Delta r_i$ changes in different manners in accordance with the radius of rotation of the belt. For the rotational radius of the belt contacting the input-side pulley operating at a torque ratio of 1:1 in a continuously variable transmission (CVT), the ideal displacement amount $\Delta r_i$ changes in the manner denoted at $\Delta r_i$ (1:1). For the rotational radius of the belt contacting the input-side pulley during over-drive, that amount changes in the manner denoted at $\Delta r_i$ (O/D). For rotational radius of the belt contacting the input-side pulley during under-drive, that amount changes in the manner denoted at $\Delta r_i$ (U/D).

Figure 10:
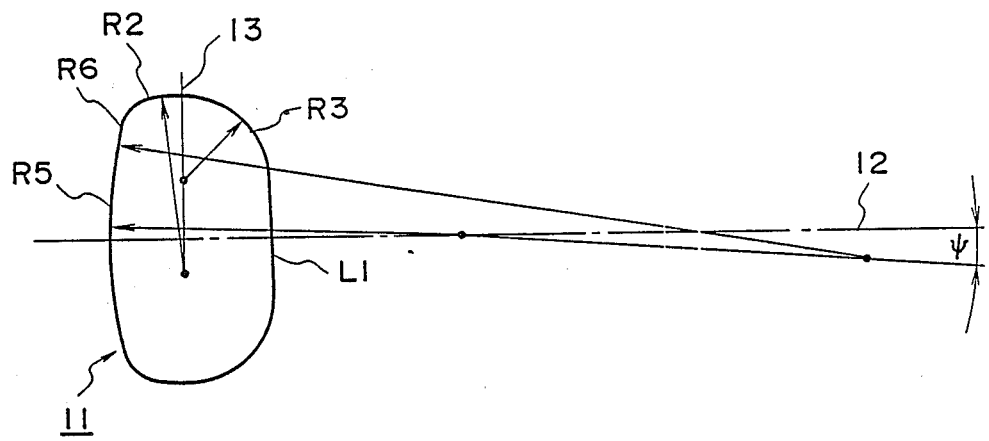
FIG. 10 is a transverse cross-sectional view of a pin in a second embodiment of the present invention.

Next, a second embodiment of the present invention will be described referring, first, to FIG. 10.

As shown in this figure, the cross-sectional configuration of a pin 11 is defined in part by (1) a first rocking surface portion R5 centered on the circumferential center line 12 through the pin 11, and (2) a second rocking surface portion R6 contiguos to the first rocking surface portion R5, located at a position remote from the circumferential center line 12 through the pin 11, and having a larger radius of curvature than the first rocking surface portion R5.

Further, the first rocking surface portion R5 meets the second rocking surface portion R6 at a portion having an angle $\phi$, as shown in the figure.

Figure 17:
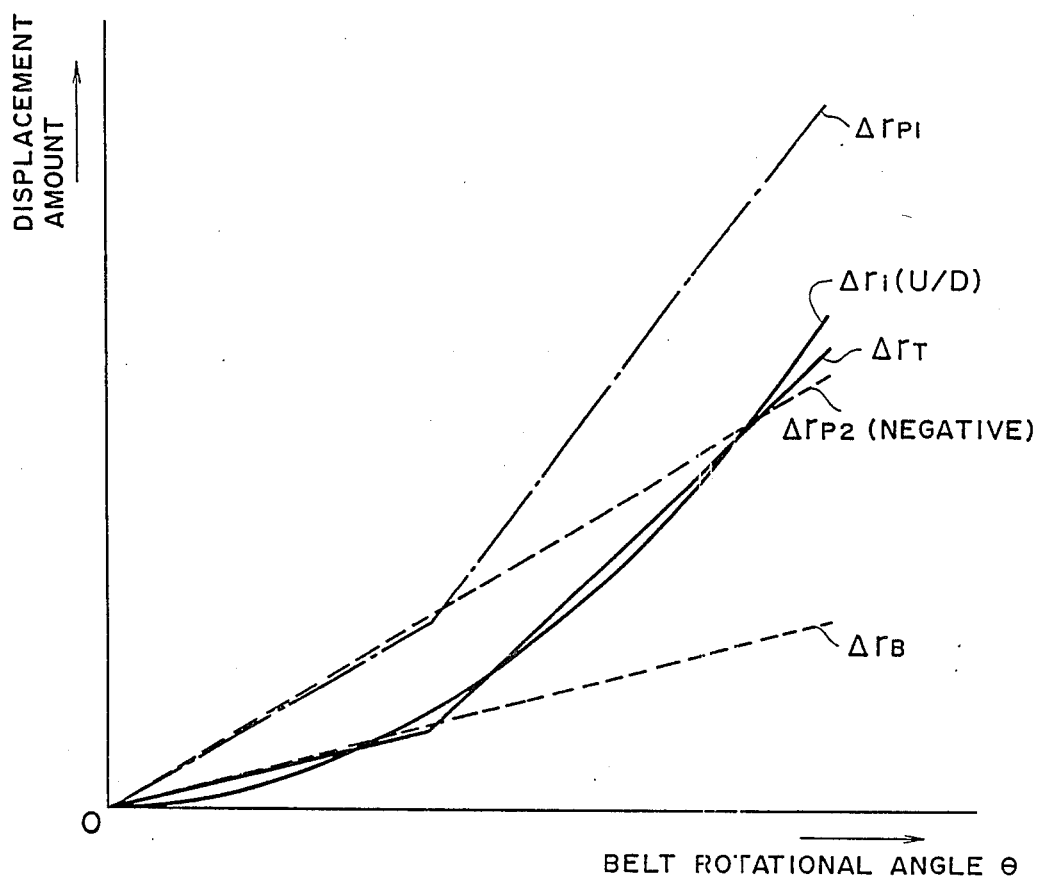
FIG. 17 is a graph showing that relationship obtained in the second embodiment.

By virtue of the above-described arrangement, the amount $\Delta r_{p1}$ of displacement of the points of contact between the pins 11 resulting from their mutual rolling contact can change in the manner shown in FIG. 17. Consequently, the difference between the ideal displacement amount $\Delta r_i$ and the total $\Delta r$ of various amounts of displacement can be further minimized, thereby achieving a further reduction in variations in the belt speed, vibration, and noise.

Figure 11:
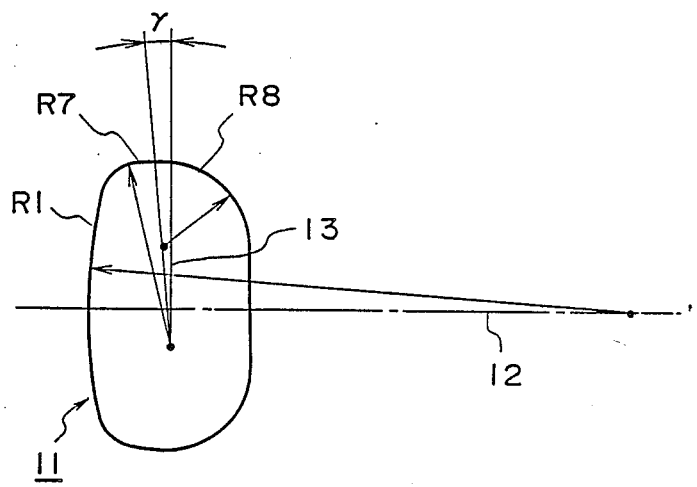
FIG. 11 is a transverse cross-sectional view of a pin in a third embodiment of the present invention.

A third embodiment is shown in FIG. 11.

Referring to this figure, the cross-sectional configuration of a pin 11 is defined in part by a rocking surface R1 centered on the circumferential center line 12 through the pin 11, a first curved surface R7 centered on the radial center line 13 through the pin 11, and a second curved surface R8 centered at a point remote from the radial center line 13 through the pin 11. The first curved surface R7 is connected to the second curved surface R8 by a surface portion extending through angle of $\gamma$ from the radial center line 13.

Figure 18:
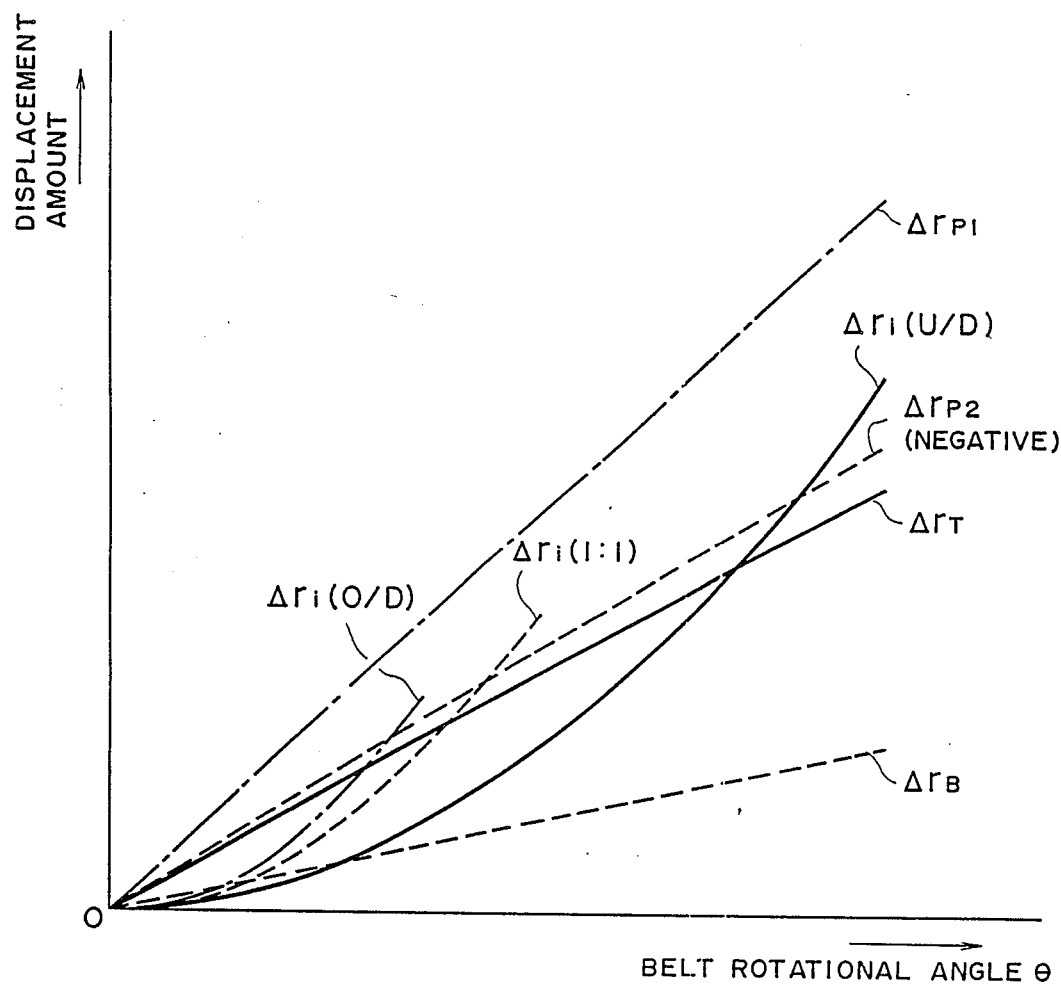
FIG. 18 is a graph showing that relationship obtained in the third embodiment.

By virtue of the above-described arrangement, the amount $\Delta r_{p2}$ of displacement of the pins per se resulting from their mutual rolling contact, as well as the amount $\Delta r_B$ of the relative displacement of the pins and the blocks resulting from their relative rotation can change in the manner shown in FIG. 18.

Figure 12:
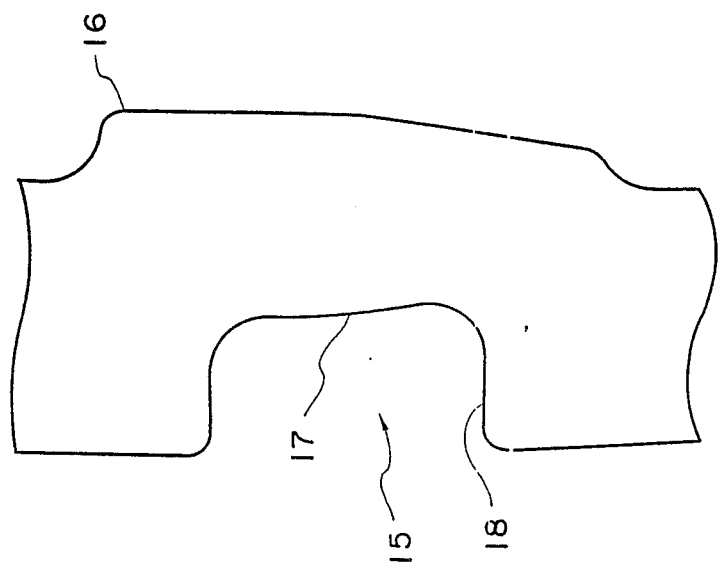
FIG. 12 is an enlarged view of a pin engagement groove portion of a block used in the first to third embodiments of the present invention.

Blocks of the endless transmission belt have pin engagement grooves formed therein for receiving pins. FIG. 12 is an enlarged view of a pin engagement groove 15 of the blocks used in the first through third embodiments of the present invention.

The pin engagement groove 15 comprises a circumferential contact surface 17 on which the block 16 comes into contact with the associated pin in the running direction of the belt, and a radial contact surface 18 on which the block 16 comes into radial contact with the pin. The radial contact surface 18 is formed as a horizontal surface.

Figure 13:
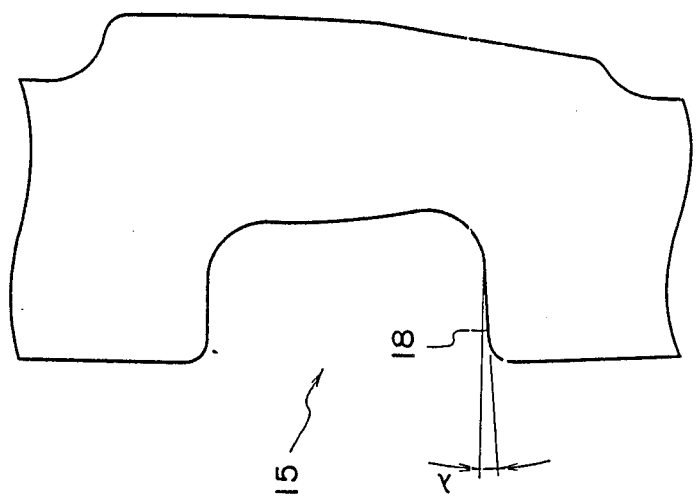
FIG. 13 is an enlarged view showing a pin engagement groove portion of a block in a fourth embodiment of the present invention.
Figure 15:
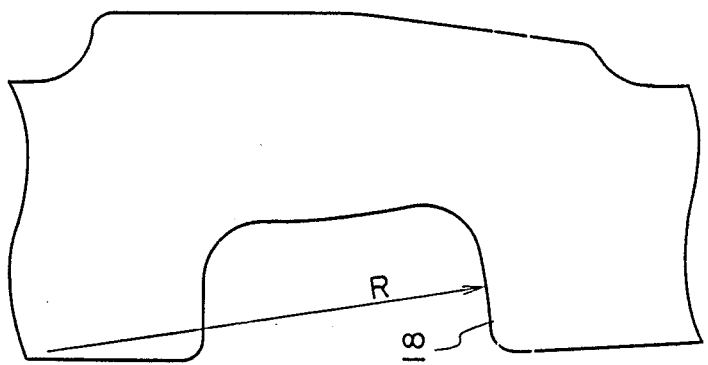
FIG. 15 is an enlarged view showing a pin engagement groove portion of a block in a sixth embodiment of the present invention.
Figure 14:
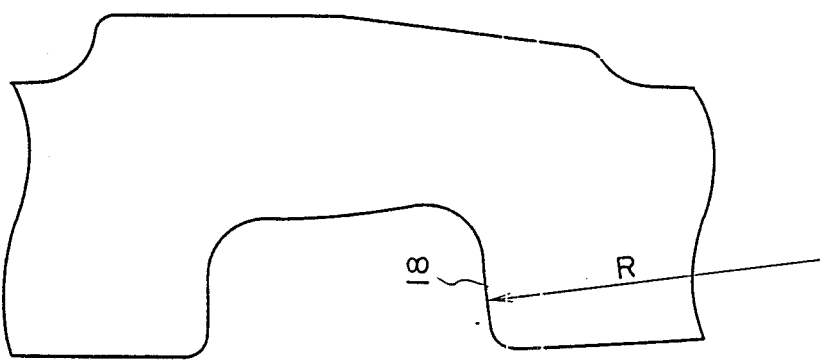
FIG. 14 is an enlarged view showing a pin engagement groove portion of a block in a fifth embodiment of the present invention.

FIGS. 13 to 15 show other embodiments which are accomplished by modifying the configuration of the pin engagement groove 15.

FIG. 13 shows a fourth embodiment. As shown in this figure, the radial contact surface 18 is inclined by an angle λ, thereby enlarging the open side of the pin engagement groove 15.

FIG. 14 shows a fifth embodiment. As shown in this figure, the radial contact surface 18 comprises a circular arc surface provided in such a manner as to enlarge the open side of the groove 15, with the center of the circular arc surface being positioned on the radially inward side of the pin engagement groove 15.

Figure 19:
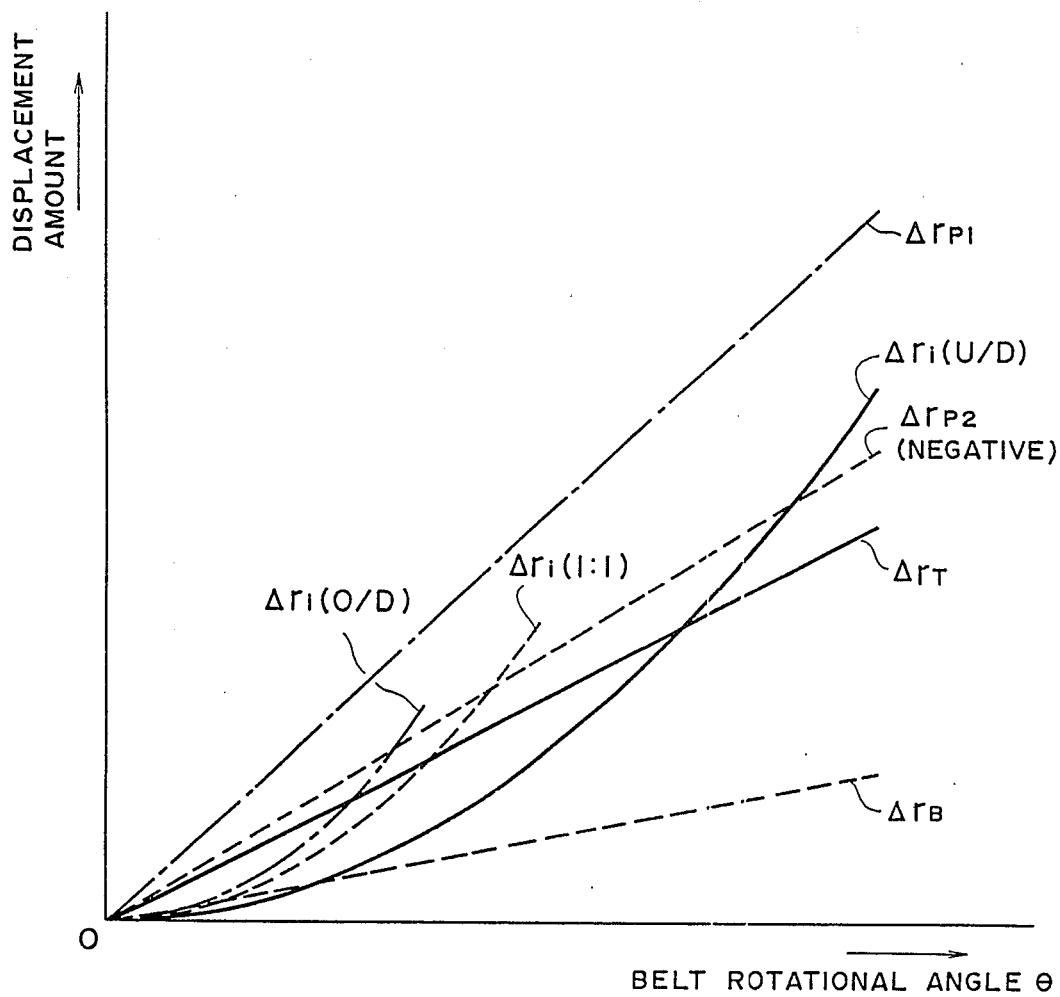
FIG. 19 is a graph showing that relationship obtained in the fourth embodiment.
Figure 20:
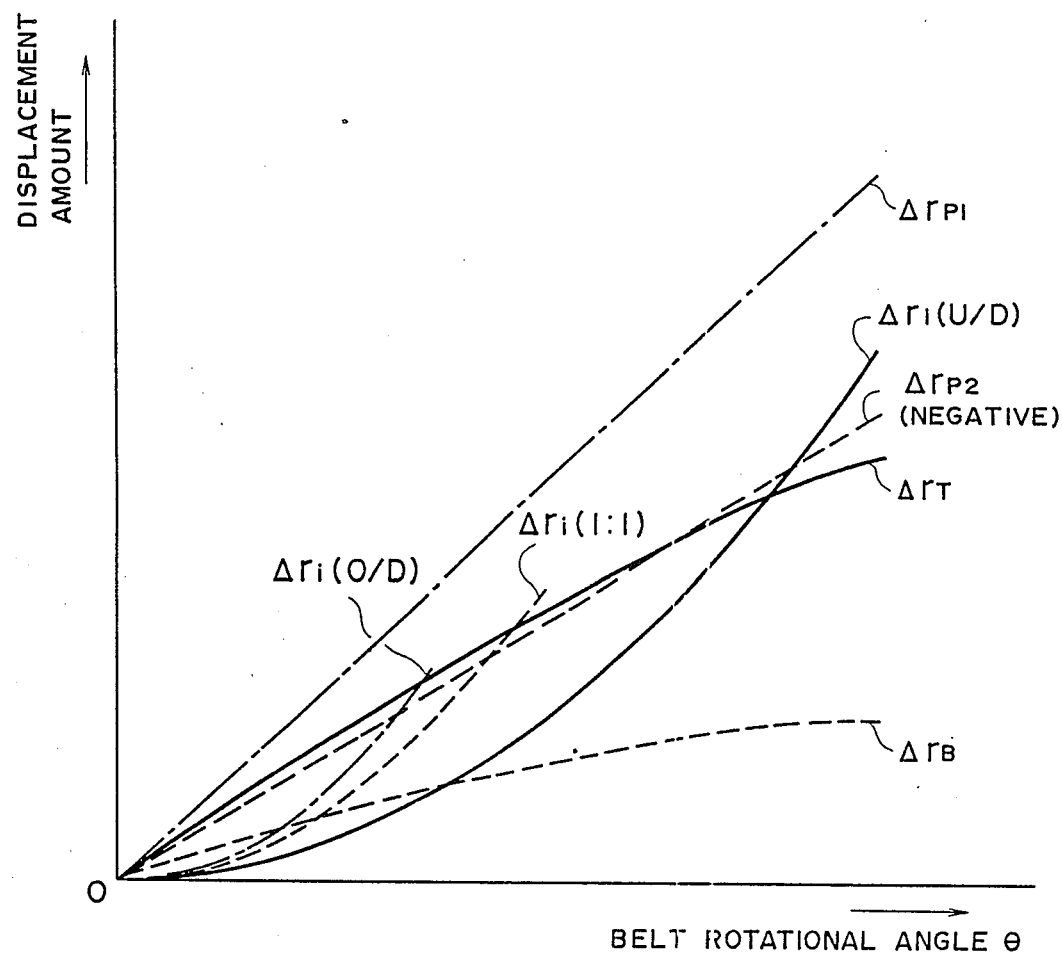
FIG. 20 is a graph showing that relationship obtained in the fifth embodiment.
Figure 21:
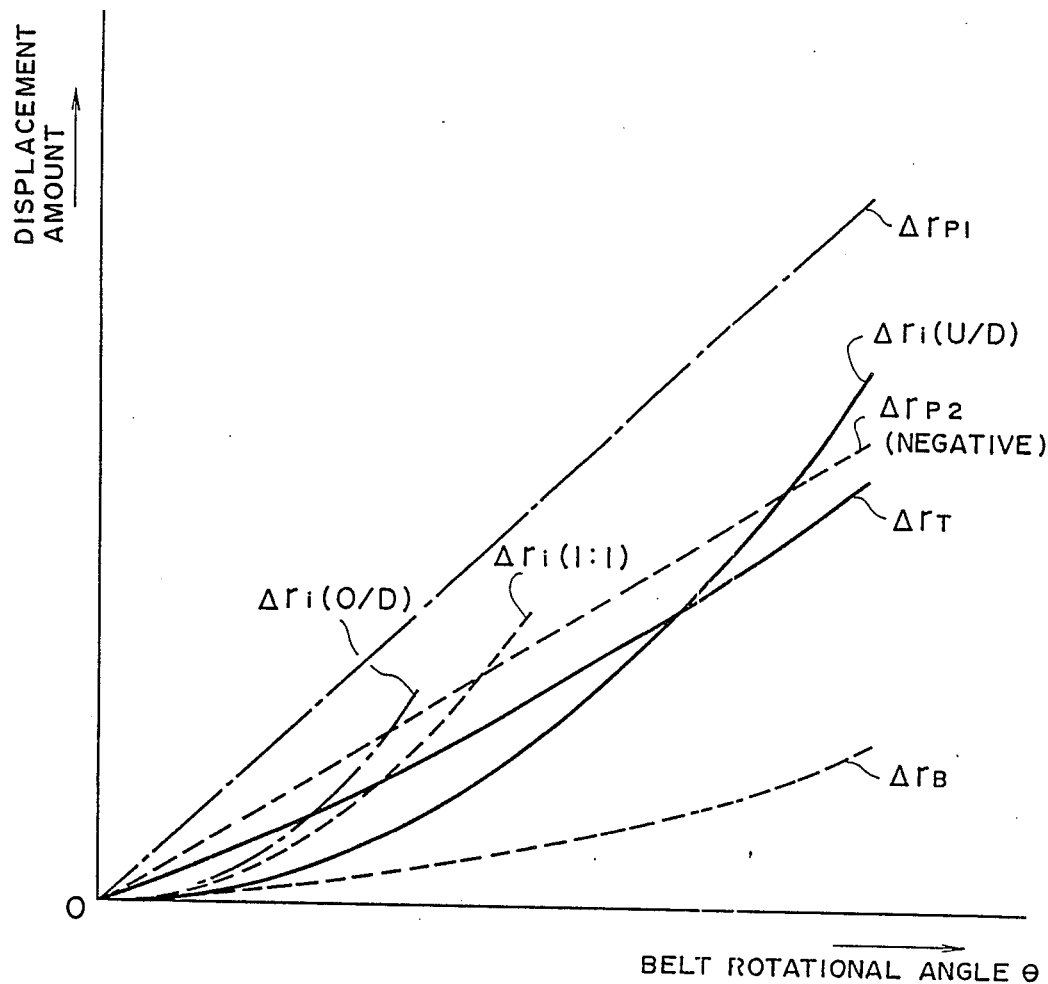
FIG. 21 is a graph showing that relationship obtained in the sixth embodiment.

With the fourth to sixth embodiments shown in FIGS. 13 through 15, the amount $\Delta r_B$ of relative displacement of the pins and the blocks resulting from their relative rotation can change in the manners shown in FIGS. 19 through 21, respectively.

Present invention may be applied to any of the endless transmission belts of various types which are shown in FIGS. 22 through 27.

Figure 22:
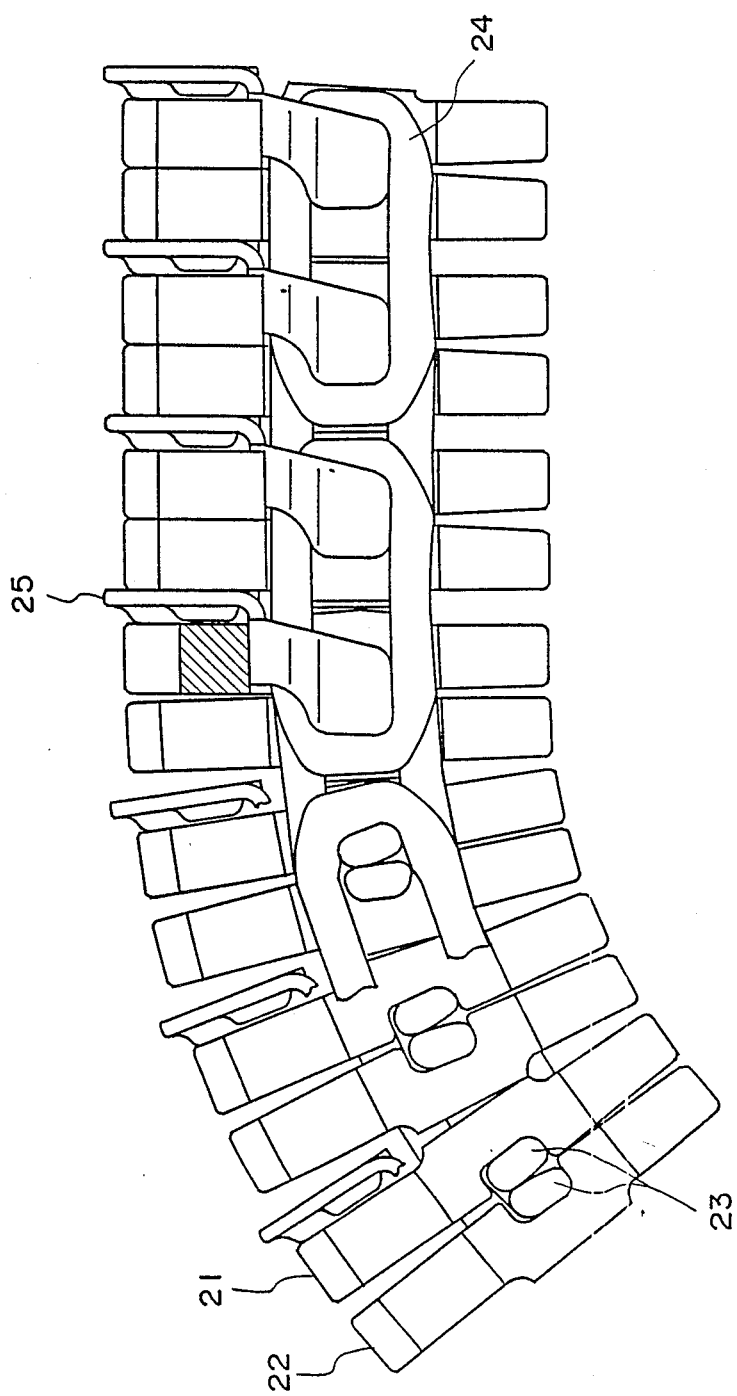
FIG. 22 is a partially sectioned side view of an endless transmission belt of the present invention.
Figure 23:
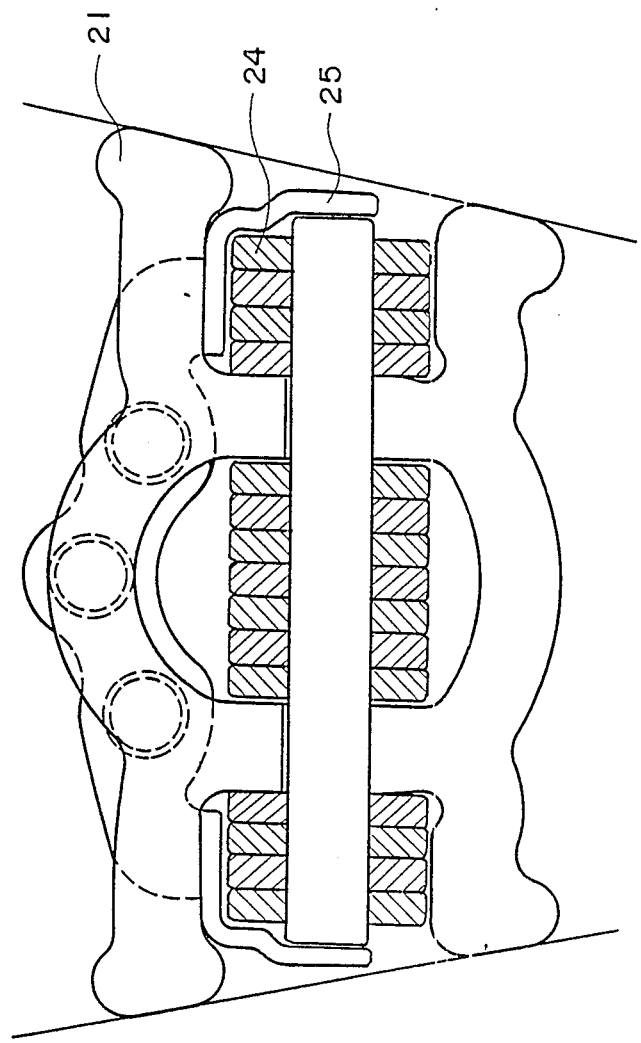
FIG. 23 is a front elevational view taken through a cross-section of the endless transmission belt shown in FIG. 22.

In the endless transmission belt shown in FIGS. 22 and 23, a pair of blocks 21 and 22 engage with pins 23 which interconnect link plates 24. Retainers 25 retain the pins 23 in place.

Figure 24:
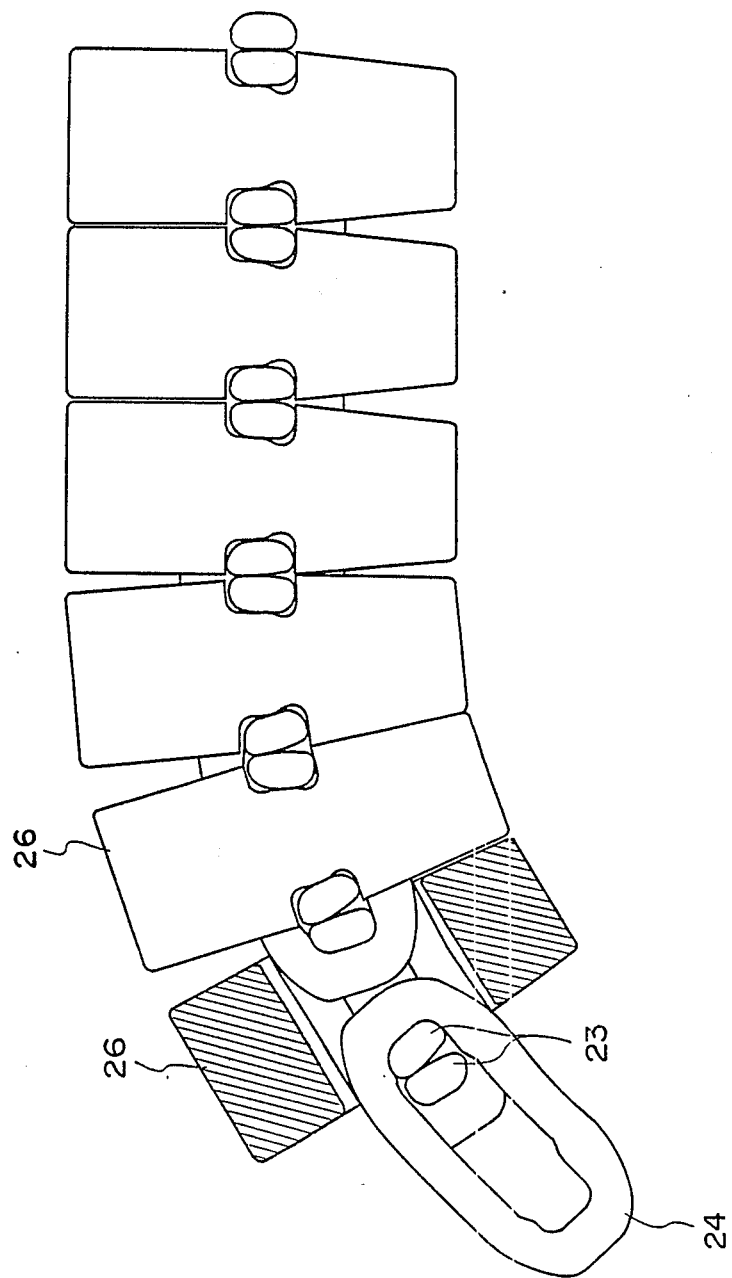
FIG. 24 is a partially sectioned side view of another embodiment endless of an transmission belt in accordance with the present invention.
Figure 25:
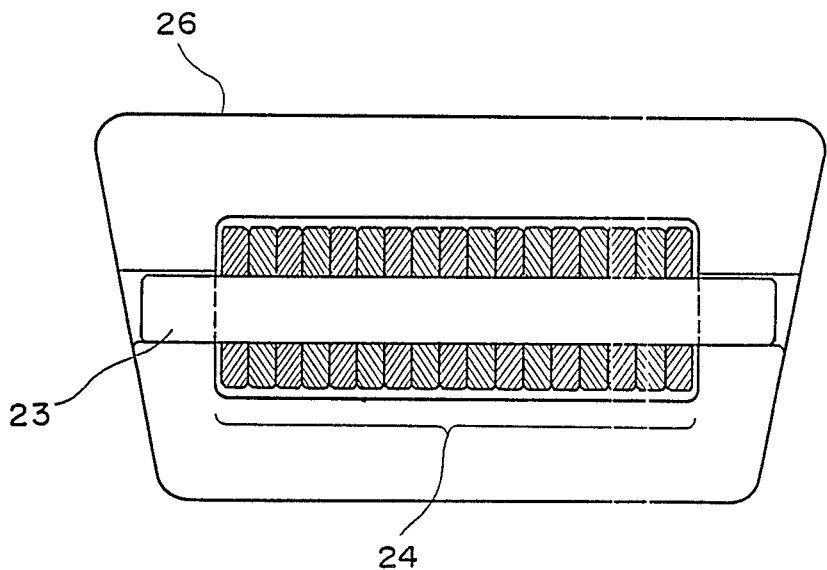
FIG. 25 is a front elevational view taken through a cross-section of the endless transmission belt shown in FIG. 24.

In the endless transmission belt shown in FIGS. 24 and 25, a block 26 of an integral type is used in lieu of a pair of blocks.

Figure 27:
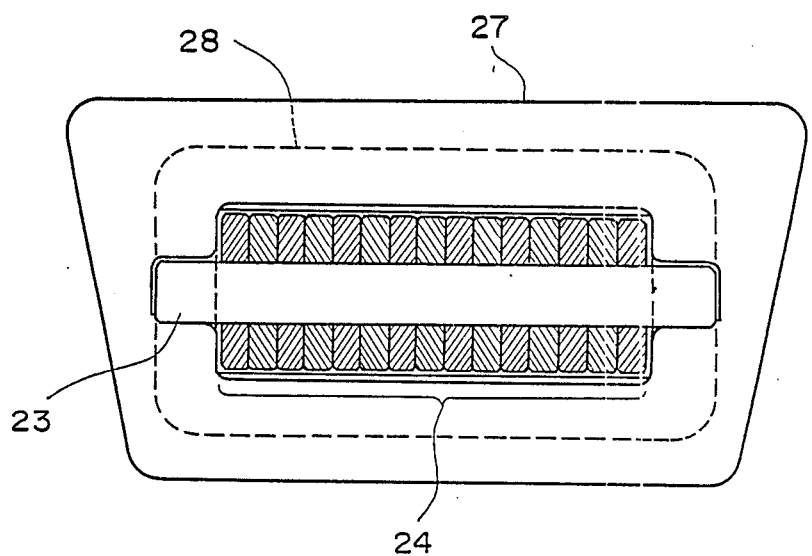
FIG. 27 is a front elevational view taken through a cross-section of the endless transmission belt shown in FIG. 26.

In the endless transmission belt shown in FIGS. 26 and 27, a large block 27 and a small block 28 form a pair. A pin engagement groove formed in the large block 27 comprises a radial contact surface alone, and a circumferential contact surface is formed in the small block 28.

By virtue of the above-described arrangement, according to the present invention, when the belt becomes engaged with the pulley, the points of contact between the pins can move along a line approximating the ideal locus. As a result, the occurrence of variation in the belt speed, vibration, and noise can be reduced.

In addition, even if any displacement of the points of mutual rolling contact of the pins, any radial displacement of the pins per se, or any relative displacement of the pins and the blocks resulting from their relative rotation does take place where the belt passes around a pulley, because the difference between the total of the amounts of these displacements and the ideal amount of displacement is small, the belt experiences only a low level of variations in the speed, vibration, and noise.

Figure 28:
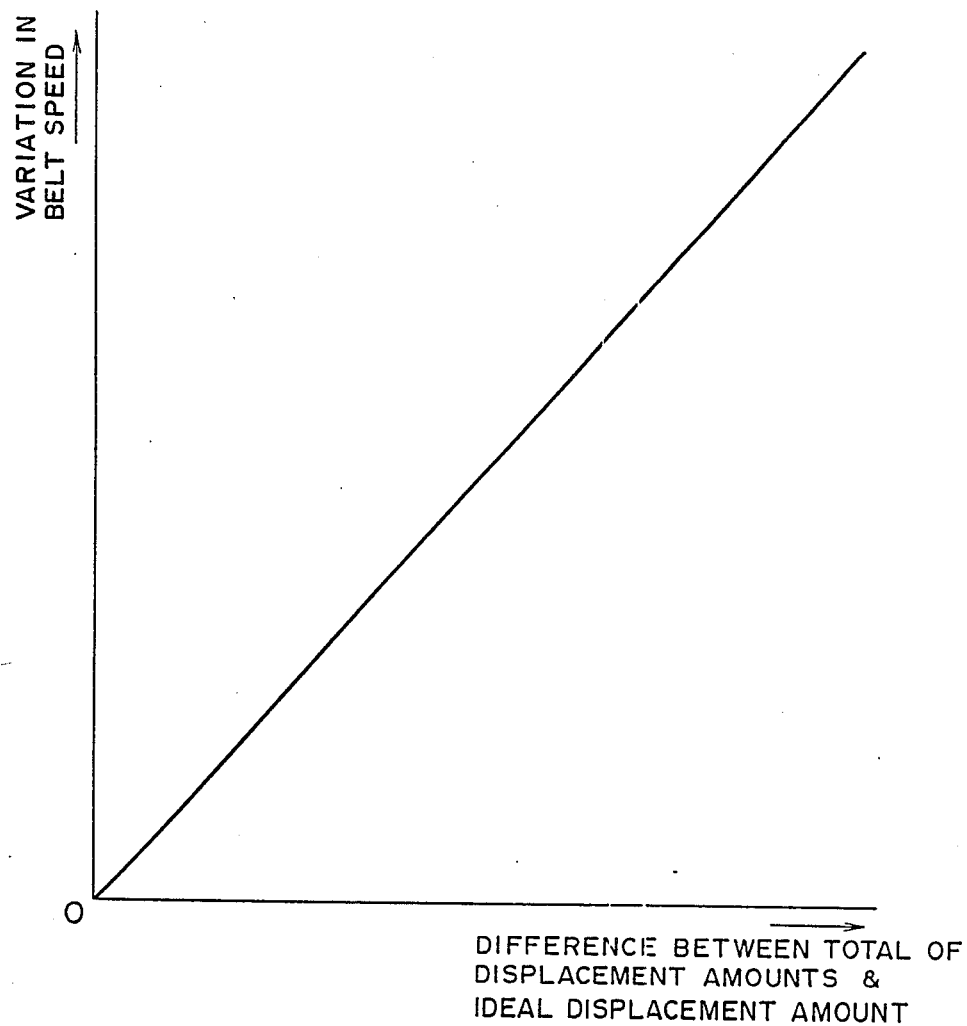
FIG. 28 is a graph showing the relationship between the variation in the belt speed and the difference between the total of various amounts of displacement and the ideal amount of displacement.
Figure 29:
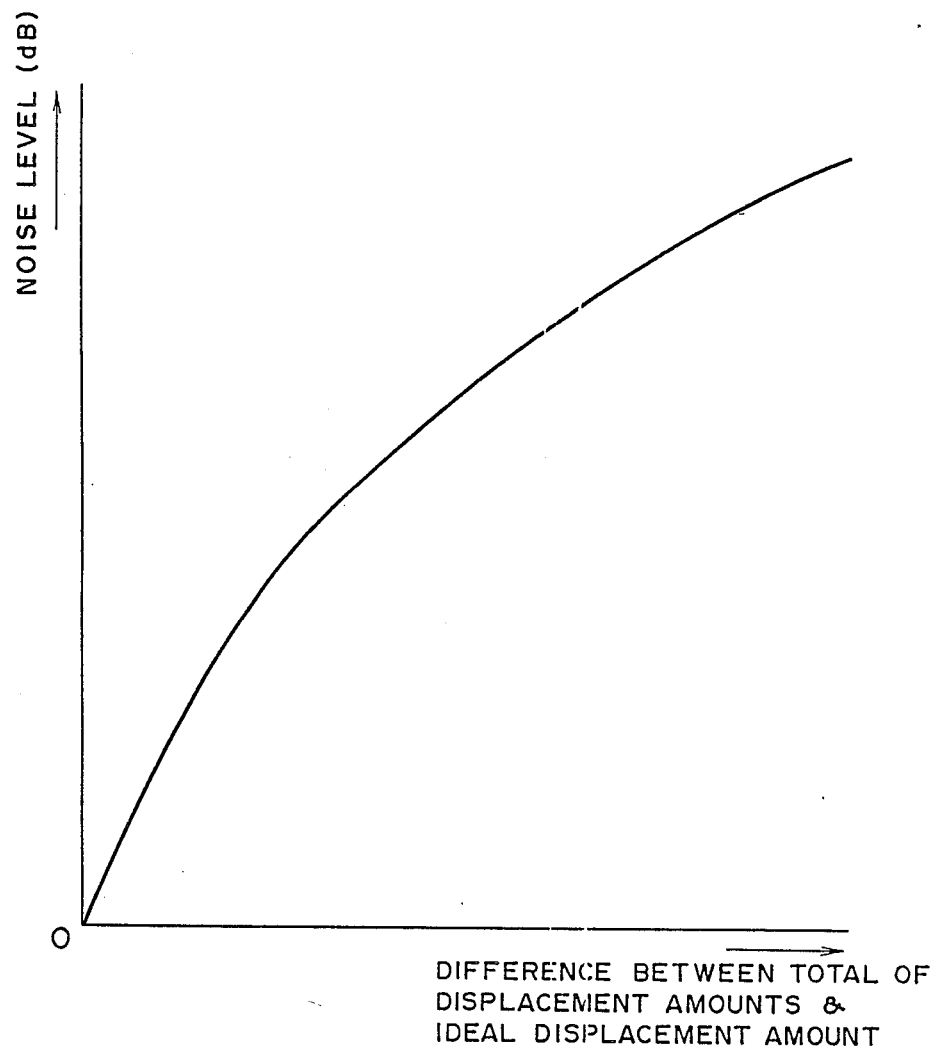
FIG. 29 is a graph showing the relationship between the level of noise and the difference between the total of various amounts of displacement and the ideal amount of displacement.

FIG. 28 shows the relationship between the variation in the belt speed and the difference between the total of the various amounts of displacement and the ideal amount of displacement. FIG. 29 shows the relationship between the level of noise and the difference between the total of the various amounts of displacement and the ideal amount of displacement. It will be understood from these figures that both the level of variations in the belt speed and the level of noise become lower as the difference between the total of the various amounts of displacement and the ideal amount of displacement becomes smaller.

FIG. 30 shows the relationship between the speed variation ratio and the CVT torque ratio. As will be clearly seen from this figure, the speed variation ratio of the endless transmission belt of the present invention is lower than that of a conventional endless transmission belt.

In addition, since each pin is symmetrical with respect to the circumferential center line, and has its symmetrical parts positioned above and below the center line, the possibility of erroneous assembly by inversion is nonexistent.

The present invention is not limited to the abovedescribed embodiments; other various modifications based on the spirit of the present invention are possible and they are not excluded from the scope of the present invention as defined by the appended claims.

What we claim is:

1. An endless transmission belt comprising:
   a plurality of sets of link plates;
   a plurality of pin pairs, each pair of pins linking one end of one set of link plates to an adjacent end of another set of link plates;
   a plurality of blocks mounted on said link plates and extending around the circumference of the belt, each of said blocks having a pin engagement groove defined by:
   a circumferential contact surface for engaging a pin in the running direction of the belt;
   an opening; and
   a pair of side walls each extending from said circumferential contact surface to said opening, one of said side walls providing a radial contact surface for a pin;
   each of said pins having a transverse cross-section defined in part by:
   a rocking surface for contact with its paired pin;
   a first curved surface for radial contact with a sidewall of said pin engagement groove; and
   a second curved surface for contacting said circumferential surface of a block and said link plates;
   the dimensions of said radial contact surface of said pin engagement groove and the dimensions of said surfaces of each pin being selected to minimize, where the belt passes over a pulley, the difference between (1) $\Delta r$ which is the total of the displacement of the points of contact between paired pins as a result of the pins of a pair rolling with respect to each other, the displacement of the pins per se and the relative displacement between said pairs of pins and said blocks due to their rotation relative to one another and (2) $\Delta r_i$ which is the ideal $\Delta r$, from the viewpoint of variation in belt speed, vibration and noise.

2. The endless transmission belt of claim 1 wherein the ratio between the radii of curvature of said rocking surface ($r_1$), said first curved surface ($r_2$) and said second curved surface ($r_3$) is approximately 6:2:1.

3. The endless transmission belt of claim 1 wherein the centers of said first and second curved surfaces are positioned along the major axis of the transverse cross-section of the pin.

4. The endless transmission belt of claim 1 wherein the center of said first curved surface is located on the major axis of the transverse cross-section of the pin and the center of said second curved surface is located remote from said major axis.

5. The endless transmission belt of claim 1 wherein said rocking surface comprises a first rocking surface portion located across the minor axis of the pin cross-section and a second rocking surface portion having a larger radius of curvature than said first rocking surface portion.

6. The endless transmission belt of claim 1 wherein said radial contact surface of said pin engagement groove is perpendicular to said opening.

7. The endless transmission belt of claim 1 wherein said radial contact surface of said pin engagement groove is inclined with respect to said opening so that said pin engagement groove widens toward said opening.

8. The endless transmission belt of claim 1 wherein said radial contact surface of said pin engagement groove has the shape of a circular arc and said pin engagement groove widens toward said opening.

9. The endless transmission of claim 8 wherein the center of said circular arc is radially inward of said pin engagement groove.

10. The endless transmission of claim 8 wherein the center of said circular arc is radially outward of said pin engagement groove.

* * * * *

UNITED STATES PATENT AND TRADEMARK OFFICE
CERTIFICATE OF CORRECTION

PATENT NO. : 4,878,887
DATED : November 7, 1989
INVENTOR(S) : SAKAKIBARA et al

It is certified that error appears in the above-identified patent and that said Letters Patent is hereby corrected as shown below:

ON THE TITLE PAGE, ITEM [57] ABSTRACT

Line 1, delete "An" and insert --The--.

Col. 1, line 31, "7b respectively" should read --7b, respectively,--;
      line 41, after "7" insert a comma --,--; and Col. 2, line 46, delete "of the"; and
      line 51, after "the" delete "(3)" and after "and" insert --(3)--.

Col. 3, line 13, delete "and";
      line 14, after "groove" insert --(2)--;
      line 18, delete "outerward" and insert --outward--;
      line 24, "he" should read --the--; and
      line 35, delete "sets" and after "linked" insert --sets--.

Col. 4, line 17, "endless of an" should read --of an endless--;
      line 24, after "embodiment" insert --of an--; and
      line 52, "rocking continuous" should read --continuous rocking--.

Col. 5, line 6, "(a)" should read --(A)--;
      line 23, after "forms" insert --a--;
      line 24, "where," should read --where--;
      line 40, "no" should read --neither--;
      line 43, "maybe" should read --may be--;

UNITED STATES PATENT AND TRADEMARK OFFICE
CERTIFICATE OF CORRECTION

PATENT NO. : 4,878,887

DATED : November 7, 1989

INVENTOR(S) : SAKAKIBARA et al

It is certified that error appears in the above-identified patent and that said Letters Patent is hereby corrected as shown below:

Col. 5, line 45, "maybe" should read --may be--.

Col. 6, line 17, delete "contiguos" and insert --contiguous--.

Col. 7, after line 8, insert the following paragraph:

--Fig. 15 shows a sixth embodiment. As shown in this figure, the radial contact surface 18 comprises a circular arc surface provided in such a manner as to enlarge the open side of the groove 15, with the center of the circular arc surface being positioned on the radially outward side of the pin engagement groove 15.--; and line 67, "abovede-" should read --above-de- --.

Signed and Sealed this

Nineteenth Day of March, 1991

*Attest:*

HARRY F. MANBECK, JR.

*Attesting Officer*   *Commissioner of Patents and Trademarks*